United States Patent
Crounse et al.

(10) Patent No.: US 10,094,491 B1
(45) Date of Patent: Oct. 9, 2018

(54) ORGANIZING DEVICE FOR CABLE AND WIRE

(71) Applicant: Wanho T Manufacturing Co., Ltd., Ilan (TW)

(72) Inventors: Christopher Pierre Crounse, Florence, AZ (US); Arthur C. Gagnon, Wolcott, CT (US)

(73) Assignee: Wanho T Manufacturing Co., Ltd., Ilan (TW)

( * ) Notice: Subject to any disclaimer, the term of this patent is extended or adjusted under 35 U.S.C. 154(b) by 0 days.

(21) Appl. No.: 15/785,462

(22) Filed: Oct. 17, 2017

(51) Int. Cl.
*F16L 3/10* (2006.01)

(52) U.S. Cl.
CPC .......... *F16L 3/1041* (2013.01); *F16L 3/1008* (2013.01); *F16L 3/10* (2013.01)

(58) Field of Classification Search
CPC ......... F16L 3/1041; F16L 3/1008; F16L 3/08; F16L 3/1058
USPC ................... 248/55, 71, 74.2, 74.3, 68.1
See application file for complete search history.

(56) References Cited

U.S. PATENT DOCUMENTS

| | | | | |
|---|---|---|---|---|
| 2,938,692 | A * | 5/1960 | Bosworth | F16L 3/10 248/68.1 |
| 3,096,960 | A * | 7/1963 | Kinney | A47L 13/512 248/113 |
| 4,330,005 | A | 5/1982 | Kjarsgaard | |
| 4,635,886 | A * | 1/1987 | Santucci | F16L 3/12 24/543 |
| 4,715,571 | A | 12/1987 | Soitow et al. | |
| 4,881,705 | A * | 11/1989 | Kraus | F16L 3/08 248/68.1 |
| 5,167,388 | A | 12/1992 | Blair | |
| 5,443,232 | A | 8/1995 | Kesinger et al. | |
| 5,742,982 | A | 4/1998 | Dodd et al. | |
| 5,816,736 | A | 10/1998 | Kroulik | |
| 5,915,572 | A * | 6/1999 | Hancock | A47B 81/005 211/64 |
| 6,462,275 | B1 | 10/2002 | Daoud | |
| 6,736,669 | B1 | 5/2004 | Martin et al. | |
| 7,607,618 | B2 | 10/2009 | Mori et al. | |
| 8,020,810 | B2 * | 9/2011 | Dietrich | F16L 3/1025 248/63 |
| 8,157,222 | B1 * | 4/2012 | Shirey | H02G 3/32 248/68.1 |
| 8,157,223 | B2 * | 4/2012 | Stau | F16L 55/035 248/74.2 |
| 8,246,583 | B2 * | 8/2012 | Bierman | A61M 25/02 128/DIG. 26 |
| D707,106 | S * | 6/2014 | Crounse | D8/356 |
| 8,967,556 | B2 * | 3/2015 | Meyers | F16L 3/2235 248/60 |

(Continued)

*Primary Examiner* — Muhammad Ijaz
(74) *Attorney, Agent, or Firm* — Charles E. Baxley (57) ABSTRACT

An organizing device includes two casing members each having a recess, and the recesses of the casing members are directed toward each other for receiving a cable, and the casing members each include one or more spring blades located in front of the recess of the casing member for engaging with the cable and for retaining the cable in the recesses of the casing members with the spring blades. The casing members each include one or more projections extended from the spring blades for frictionally engaging with the cable. The casing members each include an orifice for engaging with a fastener.

19 Claims, 9 Drawing Sheets

(56) References Cited

U.S. PATENT DOCUMENTS

| | | | |
|---|---|---|---|
| 9,857,086 B2* | 1/2018 | Michiels | F16L 3/1075 |
| 2005/0061927 A1* | 3/2005 | Schaty | F16L 3/1008 |
| | | | 248/74.4 |
| 2005/0067538 A1* | 3/2005 | Stigler | F16L 3/1008 |
| | | | 248/65 |
| 2005/0116122 A1* | 6/2005 | Nakanishi | F16L 3/223 |
| | | | 248/68.1 |
| 2010/0148015 A1* | 6/2010 | Matsuno | F16L 3/1075 |
| | | | 248/65 |
| 2013/0146720 A1* | 6/2013 | Meyers | F16L 3/223 |
| | | | 248/68.1 |
| 2013/0240684 A1* | 9/2013 | Meyers | F16L 3/2235 |
| | | | 248/74.1 |
| 2014/0091182 A1* | 4/2014 | Fukumoto | F16L 3/2235 |
| | | | 248/68.1 |
| 2014/0151514 A1* | 6/2014 | Asai | B60R 16/0215 |
| | | | 248/74.1 |
| 2015/0114710 A1* | 4/2015 | Crounse | H02G 3/32 |
| | | | 174/72 A |
| 2017/0114928 A1* | 4/2017 | Crounse | H02G 3/32 |

* cited by examiner

ORGANIZING DEVICE FOR CABLE AND WIRE

BACKGROUND OF THE INVENTION

1. Field of the Invention

The present invention relates to an organizing device, and more particularly to a cable and wire organizing device including a structure or configuration for allowing the cables and the wires to be easily and quickly engaged into the organizing device and to be easily and quickly and firmly attached or mounted or secured to various supporting facilities with the organizing device.

2. Description of the Prior Art

Typical cable organizing devices comprise a back mounting block for attaching or mounting or securing to various supporting apparatuses or facilities, the back mounting block includes a number of slots formed therein for receiving or engaging with the cables and the wires, and a front cap attached or mounted or secured to the back mounting block for clamping and retaining the cables and the wires between the back mounting block and the front cap.

For example, U.S. Pat. No. 4,330,005 to Kjarsgaard, U.S. Pat. No. 4,715,571 to Soltow et al., U.S. Pat. No. 5,167,388 to Blair, U.S. Pat. No. 5,443,232 to Kesinger et al., U.S. Pat. No. 5,742,982 to Dodd et al., U.S. Pat. No. 5,816,736 to Kroulik, U.S. Pat. No. 6,462,275 to Daud, U.S. Pat. No. 6,736,669 to Martin et al., and U.S. Pat. No. 7,607,618 to Mori et al. disclose several of the typical cable organizing devices each comprising a front part and a rear part including a number of slots formed therein for receiving or engaging with the cables and the wires, and a bracket attached or mounted or secured to the rear part for clamping and retaining the cables and the wires between the bracket and the rear part.

However, the front caps and the brackets should be removed and separated from the back mounting blocks and the rear parts before the cables and the wires may be disposed or attached or engaged into the slots that are formed between the back mounting block and the front cap or between the bracket and the rear part. In addition, the typical cable organizing devices may not stably anchor and retain the cables and the wires of different sizes or diameters or dimensions to the typical cable organizing devices, and the cables and the wires may have a good chance to be disengaged from the typical cable organizing devices.

U.S. Patent Application No. 2014/0091182 to Fukumoto discloses another typical cable organizing device comprising two casing members each including a recess formed therein, the recesses of the casing members being directed toward each other for receiving a cable. The casing members each include at least one spring blade extended therefrom and located in front of the recess of the casing member for engaging with the cable and for retaining the cable in the recesses of the casing members with the at least one spring blade.

However, the spring blades are extended and located in the inner portion of the recess of the casing member and may not suitably engage with the cable and may not solidly retain the cable in the recesses of the casing members with the spring blades, particularly when the outer diameter of the cable is not great enough to engage with the spring blades.

The present invention has arisen to mitigate and/or obviate the afore-described disadvantages of the conventional cable and wire organizing devices.

SUMMARY OF THE INVENTION

The primary objective of the present invention is to provide a cable organizing device including a structure or configuration for allowing the cables and the wires to be easily and quickly engaged into the organizing device and to be easily and quickly and firmly attached or mounted or secured to various supporting facilities with the organizing device.

The other objective of the present invention is to provide a cable organizing device including a structure or configuration for easily and quickly engaging with the cables and the wires of different dimensions or diameters and for allowing the cables and the wires of different dimensions or diameters to be easily and quickly attached or mounted to the organizing device with spring blades.

In accordance with one aspect of the invention, there is provided an organizing device comprising a first and a second casing members each including a recess formed in an inner portion of the first and the second casing members, and each recess being defined by a concave base surface and an opening portion, and the recesses of the first and the second casing members being separated from each other and faced and directed toward each other for receiving and engaging with a cable, the first and the second casing members each including an upper portion and a lower portion defined in the inner portion and located above and below the recess of the first and the second casing members, and the first and the second casing members each include a spring blade extended from the inner portion and located in front of the recess and located in the opening portion of the recess of the first and the second casing members respectively, for engaging with the cable, and for allowing the spring blades to be forced and moved toward the concave base surface of the first and the second casing members selectively with the cable, and for retaining the cable in the recesses of the first and the second casing members with the spring blades.

The spring blades of the first and the second casing members are preferably extended upwardly or downwardly from the upper portion of the first and the second casing members respectively. The first and the second casing members each include at least one projection extended from the spring blade for engaging with the cable.

The first and the second casing members each include at least one second spring blade extended from the inner portion and located in front of the recess and located in the opening portion of the recess of the first and the second casing members respectively. The second spring blades of the first and the second casing members are preferably extended upwardly or downwardly from the upper portion of the first and the second casing members respectively. The first and the second casing members each include at least one projection extended from the at least one second spring blade for engaging with the cable.

The first casing member includes a hole formed in the first casing member, and the second casing member includes a peg extended from the second casing member for engaging with the hole of the first casing member and for anchoring and retaining the first and the second casing members together. The first and the second casing members each include at least one cavity formed in the first and the second casing members for weight reducing purposes.

The first and the second casing members each include an upper notch and a lower notch formed in the upper portion and the lower portion of the first and the second casing members respectively, and located above and below the recess of the first and the second casing members respectively, and a bulge extended and located between the recess and the upper notch and the lower notch of the first and the second casing members respectively for engaging with the spring blade.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Referring to the drawings, and initially to FIGS. 1-6, a cable organizing device in accordance with the present invention comprises two casing members 10, 11, such as first and second casing members 10, 11 which may be symmetric to each other selectively or optionally, or which include a mirror symmetric structure selectively or optionally, the casing members 10, 11 each include one or more (such as two) depressions or recesses 12 formed therein, such as formed in the inner portion 13 of the respective casing member 10, 11, and each defined by a concave base surface 14 and an opening portion 15 (FIGS. 4-7), and the recesses 12 of the casing members 10, 11 are separated or spaced from each other, but faced or directed toward each other for receiving or engaging with the cables 80 and/or the wires 81 (FIGS. 1, 3-6, and 8-9), for example.

The recesses 12 at the inner portions 13 of the casing members 10, 11 are faced or directed toward each other for forming or defining an inner diameter greater than that of the cables 80 and the wires 81 and thus for allowing the cables 80 and the wires 81 of different dimensions or sizes or shapes or contours or standards or diameters to be suitably received or engaged in the recesses 12 of the casing members 10, 11. One of the recesses 12 of the respective casing member 10, 11 will be discussed in more details hereinafter. The first and the second casing members 10, 11, for example, each include an upper portion 16 and a lower portion 17 formed or defined in the inner portion 13 thereof and defined or located above and below the recess 12 of the respective casing member 10, 11, or the opening portion 15 of the recess 12 of the respective casing member 10, 11 is formed and located between the upper portion 16 and the lower portion 17 of the respective casing member 10, 11.

The casing members 10, 11 each further include, selectively or optionally, an upper cavity or notch 18 and a lower cavity or notch 19 formed therein, such as formed in the upper portion 16 and the lower portion 17 of the respective casing member 10, 11 respectively, and defined and located above and below the recess 12 of the respective casing member 10, 11, and a swelling or protrusion or bulge 20, 21 extended or provided or located between the recess 12 and the upper notch 18 and the lower notch 19 of the respective casing member 10, 11. The casing members 10, 11 each further include one or more holes 22 formed therein, and one or more keys or pegs 23 extended therefrom (FIGS. 2-4 and 7), and the pegs 23 of one of the casing members 10, 11 may be engaged with the holes 22 of the other casing members 11, 10 for anchoring or retaining or positioning the casing members 10, 11 together and for preventing the casing members 10, 11 from moving or shifting up and down and laterally relative to each other.

The casing members 10, 11 each further include one or more or a number of bars or spring blades 30, 31, 32, 33 extended downwardly from the upper portion 16 thereof and provided and located in the inner portion 13 of the casing members 10, 11 and/or located in front of the recesses 12 of the casing members 10, 11 at the opening portion 15 of the recess 12 of the casing member 10, 11 and spaced or separated from the concave base surface 14 of the casing member 10, 11; and one or more or a number of bars or spring blades or elements 35, 36, 37 extended upwardly from the lower portion 17 thereof and provided and located in the inner portion 13 of the casing members 10, 11 and/or located in front of the recesses 12 of the casing members 10, 11 at the opening portion 15 of the recess 12 of the casing member 10, 11 and spaced or separated from the concave base surface 14 of the casing member 10, 11, and arranged and located between the other spring blades 30, 31, 32, 33 respectively and alternatively.

Figure 7:
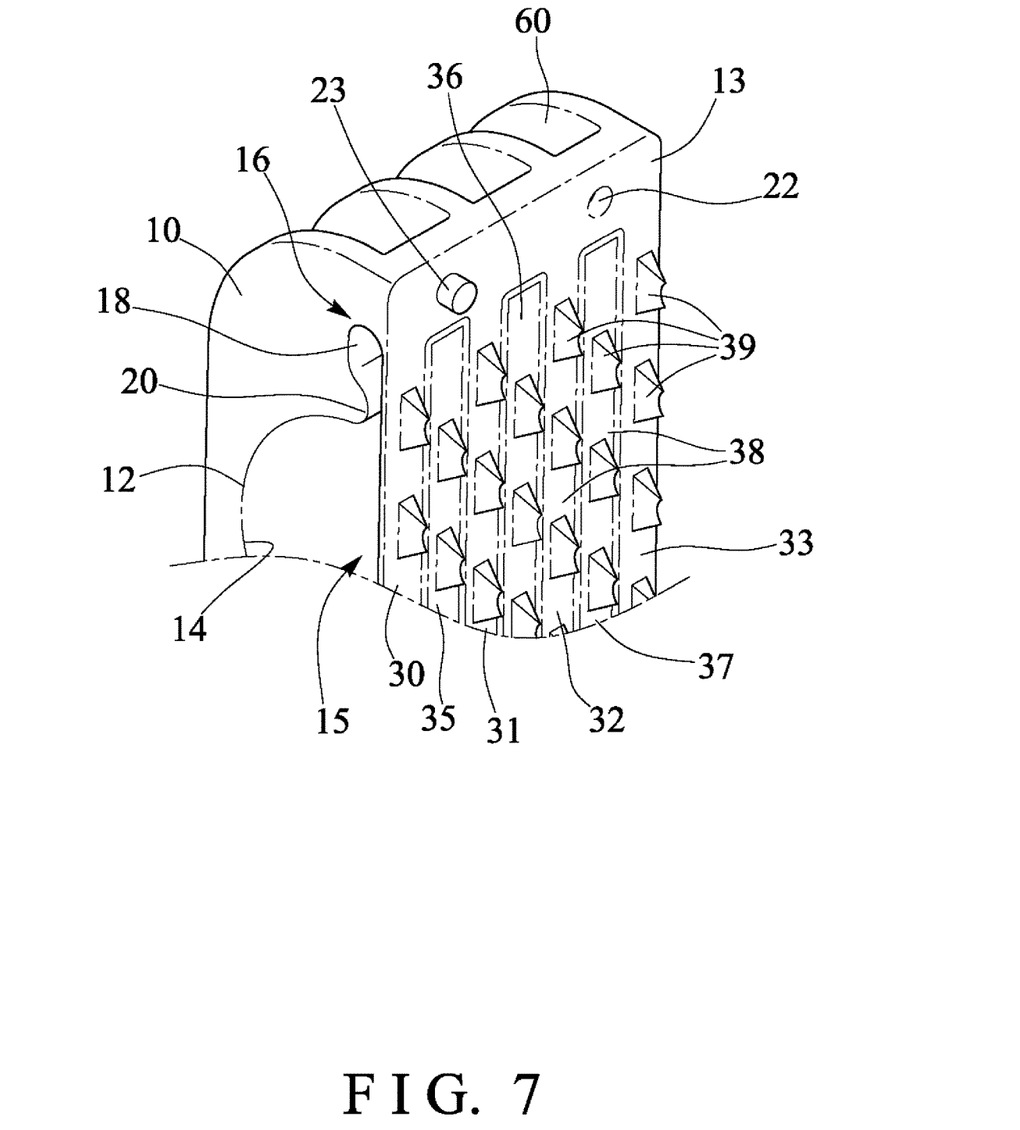
FIG. 7 is an enlarged partial perspective view of the cable organizing device.

The spring blades 30, 31, 32, 33 and the spring elements 35, 36, 37 are made of soft or resilient materials and flexible and are provided for contacting or engaging with the cables 80 and/or wires 81 and may be forced and moved toward the concave base surface 14 of the casing member 10, 11 selectively or optionally with or by the cables 80 and/or wires 81 (FIGS. 1, 3, 5-6 and 8-9) and for allowing the cables 80 and the wires 81 of different dimensions or sizes or shapes or contours or standards or diameters to be suitably clamped and anchored or retained in the recesses 12 of the casing members 10, 11 with the spring blades 30, 31, 32, 33 and the spring elements 35, 36, 37 (FIGS. 1, 5-6, and 8-9). The spring blades 30, 31, 32, 33 and the spring elements 35, 36, 37 are suitably separated or spaced from each other with slots or grooves 38 (FIG. 7). The spring blades 30, 31, 32, 33 and the spring elements 35, 36, 37 may be contacted or engaged with the bulge 20, 21 when the spring blades 30, 31, 32, 33 and the spring elements 35, 36, 37 are forced and moved toward the concave base surface 14 of the casing member 10, 11.

It is preferable that the spring blades 30, 31, 32, 33 and the spring elements 35, 36, 37 each include a number of protrusions or projections 39 extended therefrom (FIGS. 1-9) for frictionally contacting or engaging with the cables 80 and/or wires 81 and for firmly clamping and retaining and anchoring or retaining or positioning the cables 80 and/or wires 81 in the recesses 12 of the casing members 10, 11 and between the casing members 10, 11. The casing members 10, 11 each further include an orifice 40 formed therein, and the orifices 40 of the casing members 10, 11 are aligned with each other for receiving or engaging with a fastener 50 which may secure or retain or position the casing members 10, 11 together and/or which may secure or attach or mount the casing members 10, 11 to any suitable supporting elements 90, such as the brackets, or the wall member 90 (FIGS. 1, and 8-9) or the like.

Figure 1:
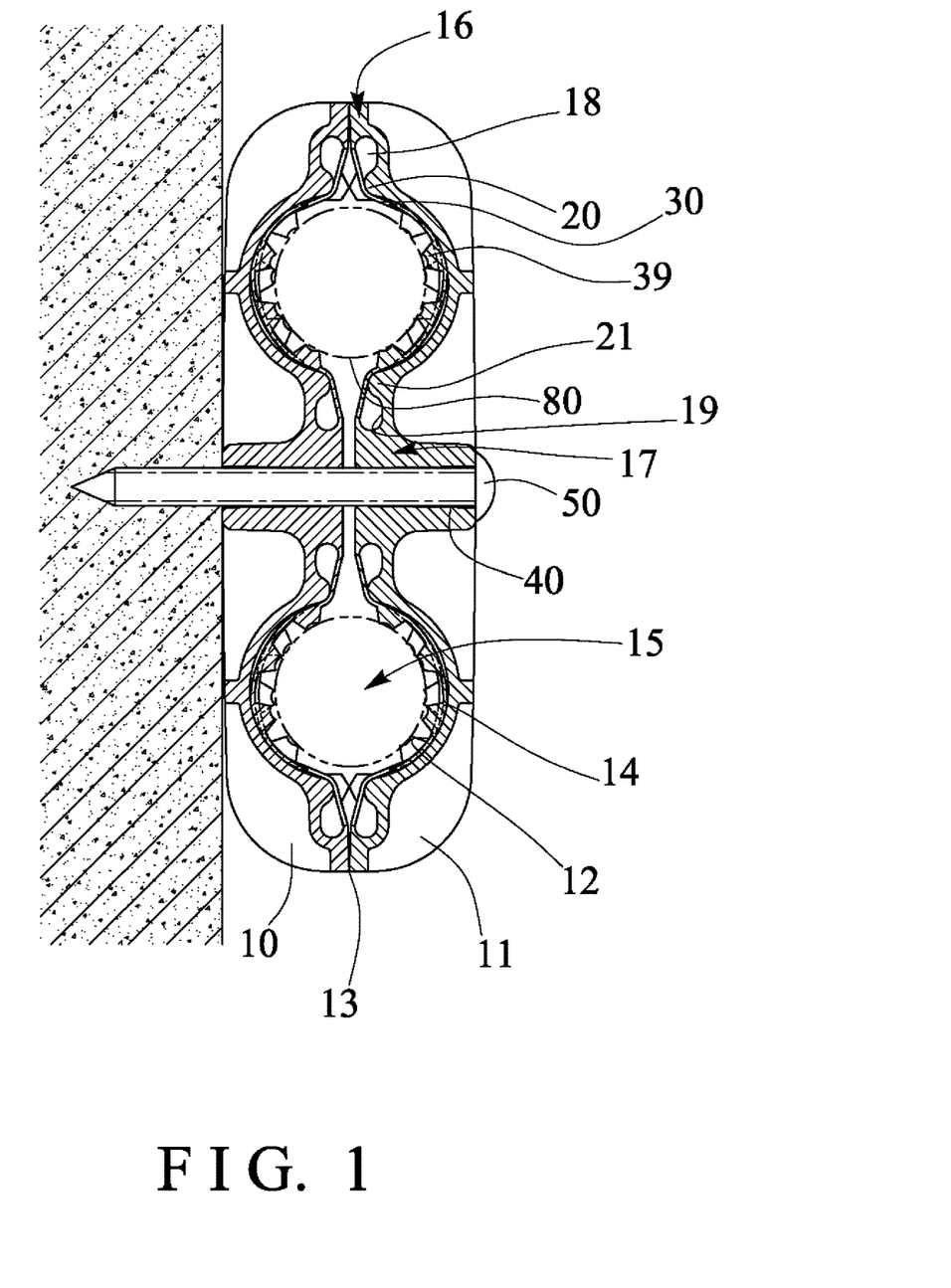
FIG. 1 is a cross sectional view illustrating the operation of a cable organizing device in accordance with the present invention.
Figure 2:
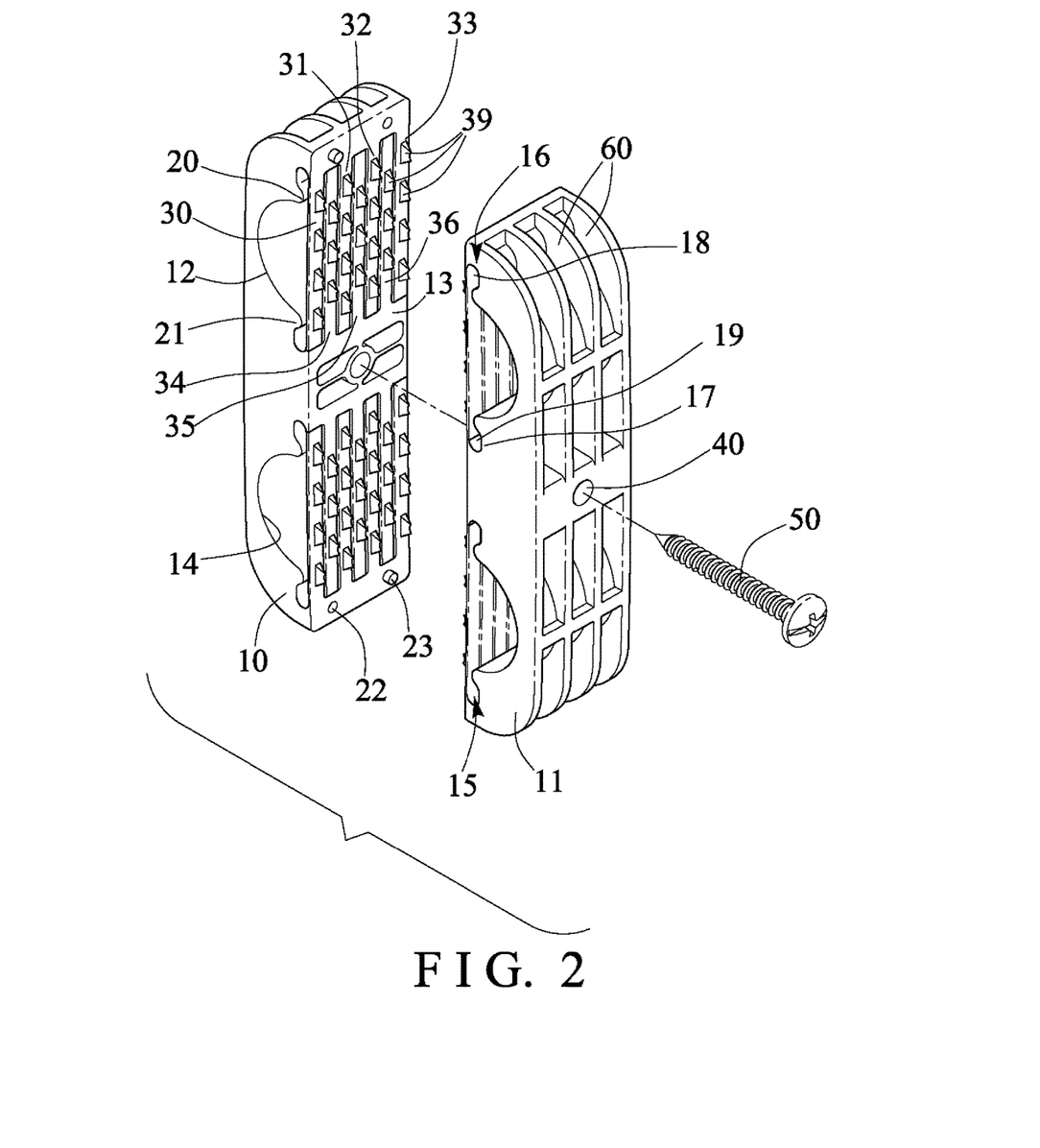
FIG. 2 is a partial exploded view of the cable organizing device.
Figure 3:
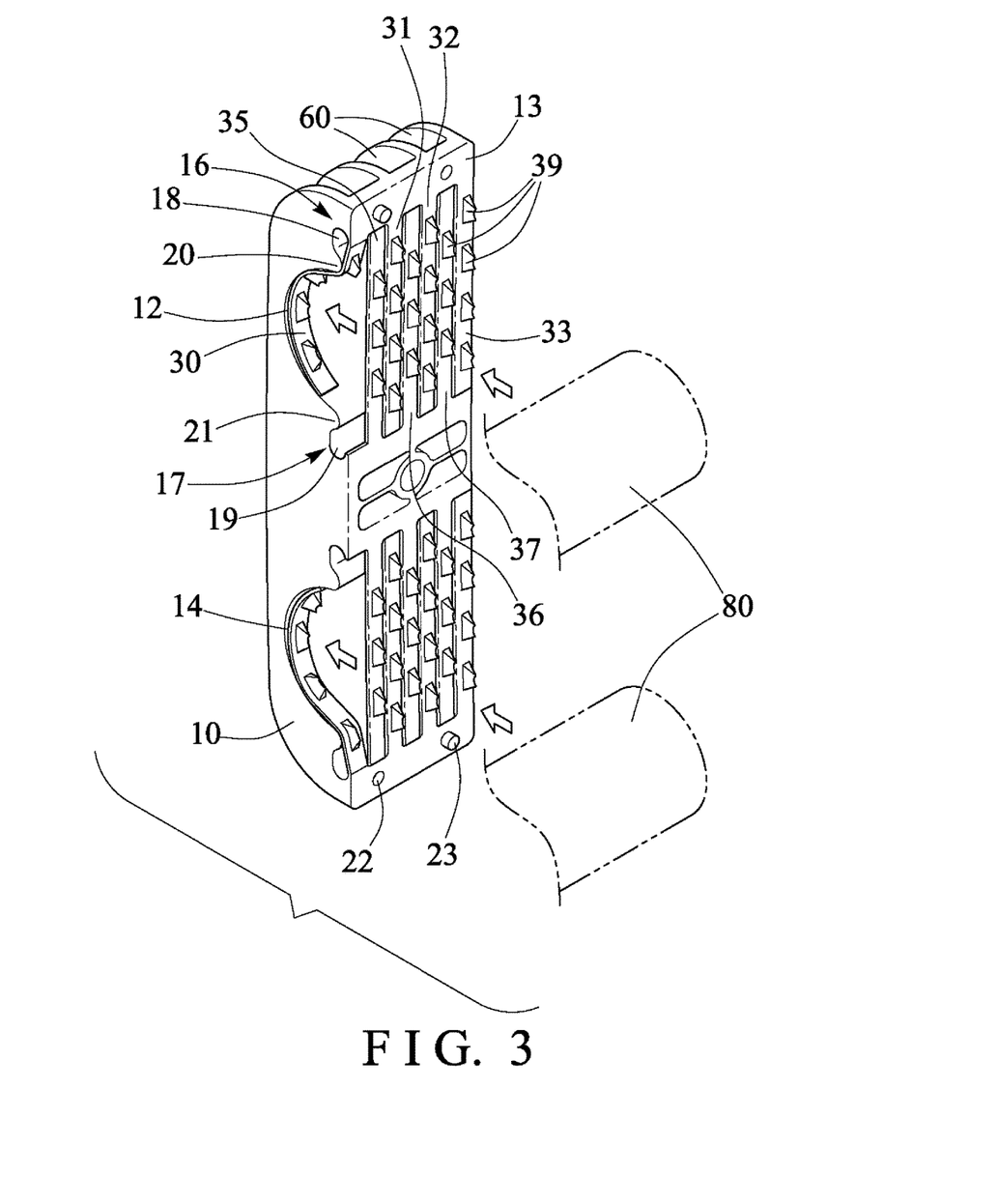
FIG. 3 is a partial perspective view of the cable organizing device.
Figure 4:
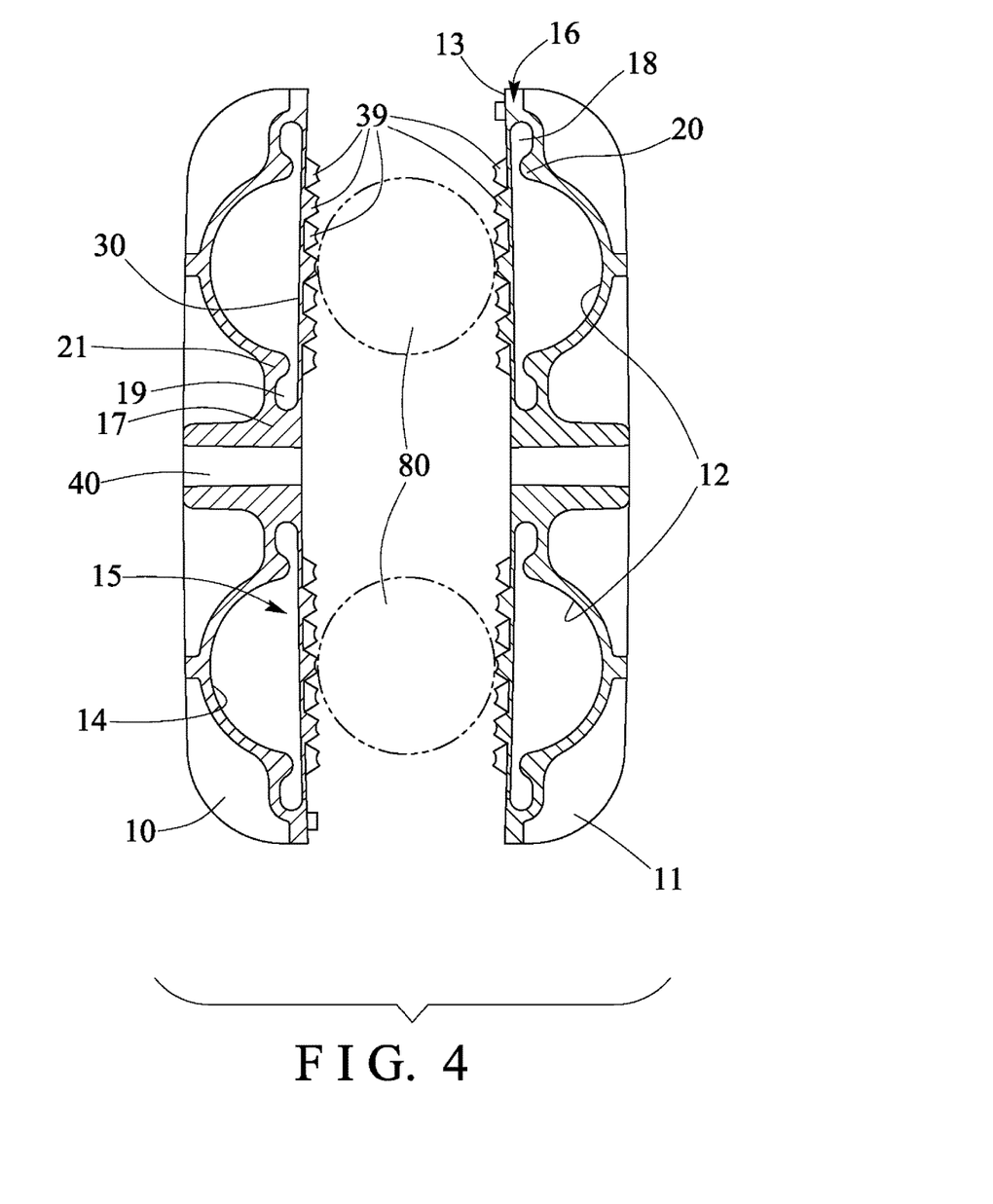
FIG. 4 is a cross sectional view illustrating the cable organizing device as shown in FIG. 2.
Figure 5:
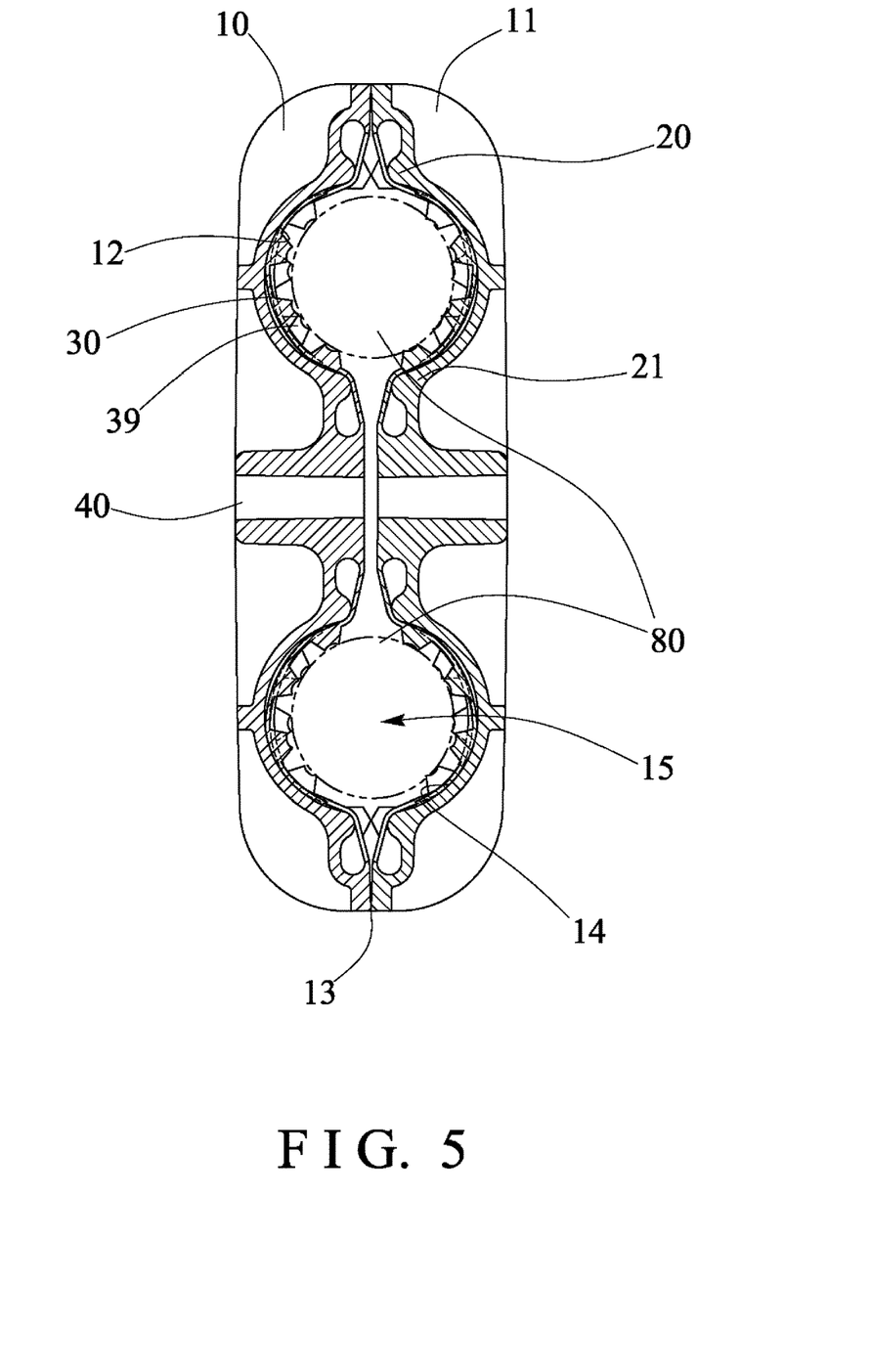
FIG. 5 is a cross sectional view of the cable organizing device.
Figure 6:
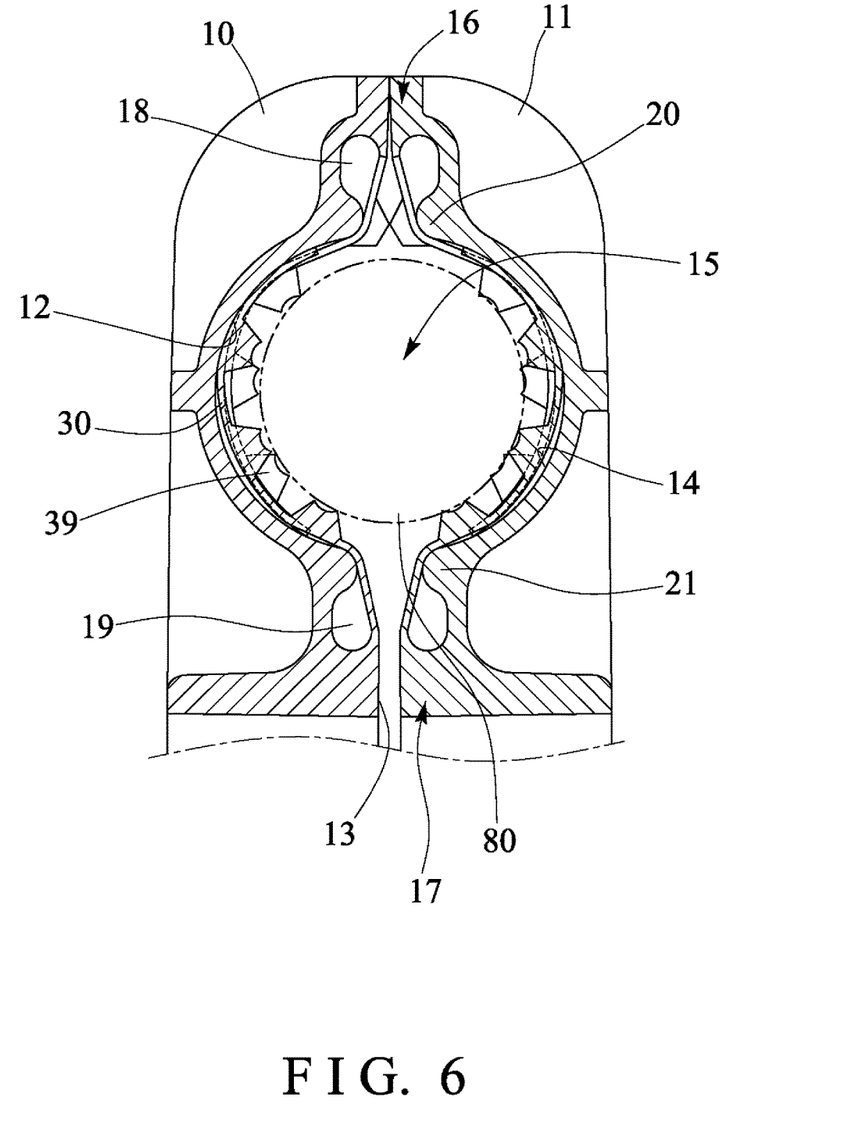
FIG. 6 is an enlarged partial cross sectional view of the cable organizing device.
Figure 8:
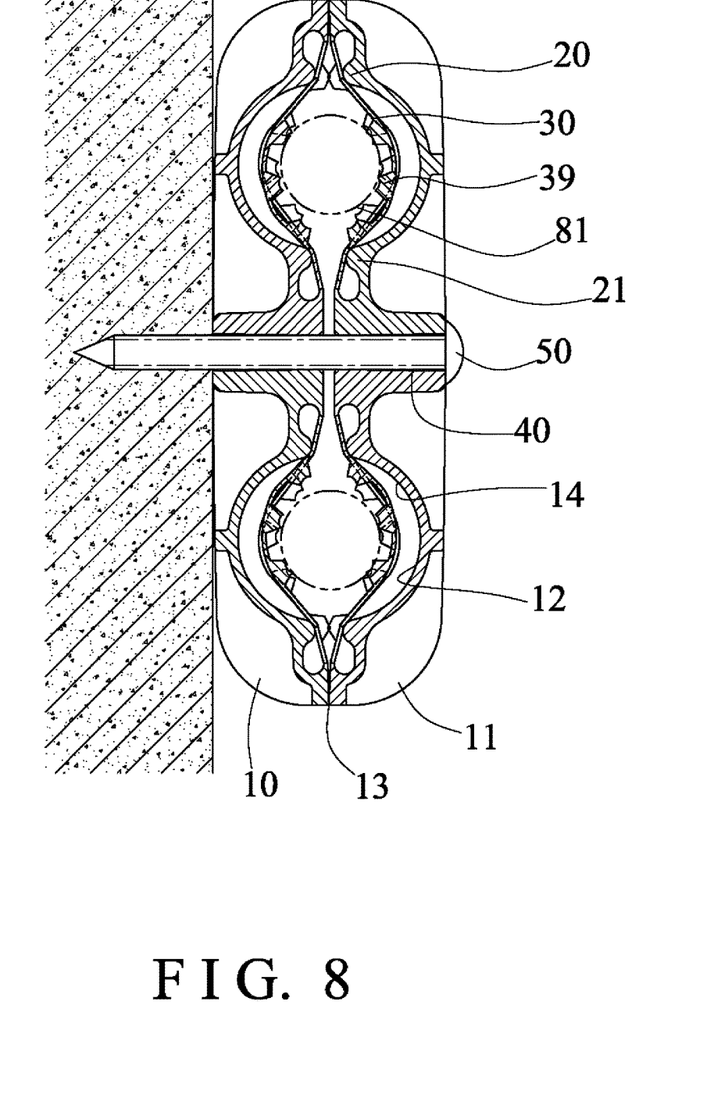
FIGS. 8 and 9 are cross sectional views similar to FIG. 1, illustrating the operation of the cable organizing device.
Figure 9:
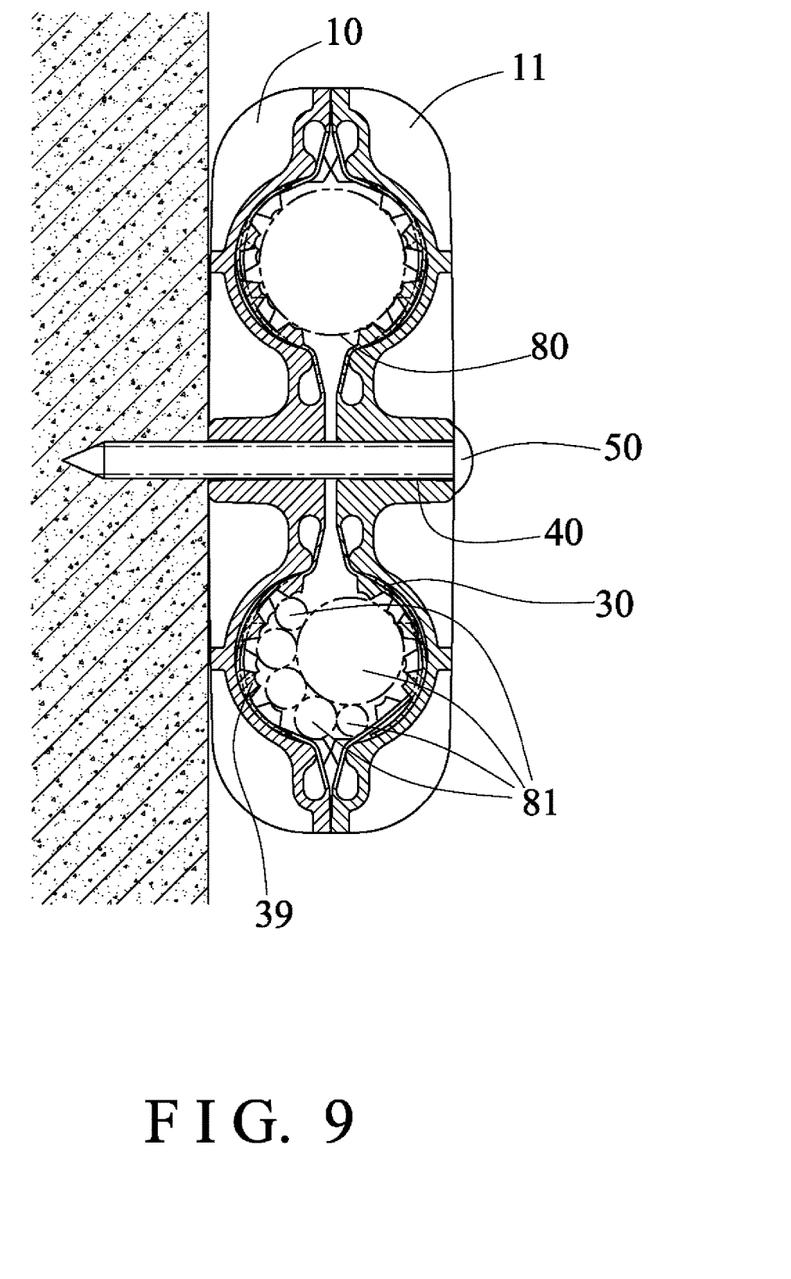

In operation, as shown in FIGS. 1 and 8-9, the cables 80 and the wires 81 of different dimensions or sizes or shapes or contours or standards or diameters may be suitably received or engaged in the recesses 12 of the casing members 10, 11 and may be suitably and resiliently clamped and anchored or retained in the recesses 12 of the casing members 10, 11 with the spring blades 30, 31, 32, 33 and the spring elements 35, 36, 37. The casing members 10, 11 each may further include one or more or a number of cavities 60 formed therein, for weight reducing purposes, for example.

Accordingly, the cable organizing device includes a structure or configuration for allowing the cables and the wires to be easily and quickly engaged into the organizing device and to be easily and quickly and firmly attached or mounted or secured to various supporting facilities with the organizing device, and for allowing the cables and the wires of different dimensions or diameters to be easily and quickly attached to the organizing device with spring blades.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. An organizing device comprising:
  a first casing member including a recess formed in an inner portion of said first casing member, said recess of said first casing member being defined by a concave base surface and an opening portion, said first casing member including an upper portion located above said recess of said first casing member, and a lower portion located below said recess of said first casing member,
  a second casing member including a recess formed in an inner portion of said second casing member, said recess of said second casing member being defined by a concave base surface and an opening portion, said second casing member including an upper portion located above said recess of said second casing member, and a lower portion located below said recess of said second casing member, said recesses of said first and said second casing members being separated from each other and faced and directed toward each other for receiving and engaging with a cable,
  said first casing member including a first spring blade extended from said inner portion and located in front of said recess of said first casing member and located in said opening portion of said recess of said first casing member, for engaging with said cable, and for allowing said first spring blade to be forced and moved toward said concave base surface of said first casing member with said cable, and for retaining said cable in said recess of said first casing member with said first spring blade,
  said first casing member including at least one second spring blade extended from said inner portion and located in front of said recess of said first casing member and located in said opening portion of said recess of said first casing member,
  said second casing member including a first spring blade extended from said inner portion and located in front of said recess of said second casing member and located in said opening portion of said recess of said second casing member, for engaging with said cable, and for allowing said first spring blade of said second casing member to be forced and moved toward said concave base surface of said second casing member with said cable, and for retaining said cable in said recess of said second casing member with said first spring blade of said second casing member, and
  said second casing member including at least one second spring blade extended from said inner portion and located in front of said recess of said second casing member and located in said opening portion of said recess of said second casing member.

2. The organizing device as claimed in claim 1, wherein said first spring blade of said first casing member is extended downwardly from said upper portion of said first casing member.

3. The organizing device as claimed in claim 1, wherein said first casing member includes at least one projection extended from said first spring blade of said first casing member for engaging with said cable.

4. The organizing device as claimed in claim 1, wherein said at least one second spring blade of said first casing member is extended downwardly from said upper portion and located in front of said recess of said first casing member.

5. The organizing device as claimed in claim 1, wherein said first casing member includes at least one projection extended from said at least one second spring blade of said first casing member for engaging with said cable.

6. The organizing device as claimed in claim 1, wherein said first spring blade of said second casing member is extended downwardly from said upper portion of said second casing member.

7. The organizing device as claimed in claim 1, wherein said second casing member includes at least one projection extended from said first spring blade of said second casing member for engaging with said cable.

8. The organizing device as claimed in claim 1, wherein said at least one second spring blade of said second casing member is extended downwardly from said upper portion and located in front of said recess of said second casing member.

9. The organizing device as claimed in claim 1, wherein said second casing member includes at least one projection extended from said at least one second spring blade of said second casing member for engaging with said cable.

10. The organizing device as claimed in claim 1, wherein said first casing member includes a hole formed in said first casing member, and said second casing member includes a peg extended from said second casing member for engaging with said hole of said first casing member and for anchoring and retaining said first and said second casing members together.

11. The organizing device as claimed in claim 1, wherein said first and said second casing members each include at least one cavity formed in said first and said second casing members.

12. The organizing device as claimed in claim 1, wherein said first casing member includes an upper notch formed in said upper portion of said first casing member and located above said recess of said first casing member, and a bulge extended and located between said recess and said upper notch of said first casing member for engaging with said first and said at least one second spring blades of said first casing member.

13. The organizing device as claimed in claim 1, wherein said first casing member includes a lower notch formed in said lower portion of said first casing member and located below said recess of said first casing member, and a bulge extended and located between said recess and said lower notch of said first casing member for engaging with said first and said at least one second spring blades of said first casing member.

14. The organizing device as claimed in claim 1, wherein said second casing member includes an upper notch formed in said upper portion of said second casing member and located above said recess of said second casing member, and a bulge extended and located between said recess and said upper notch of said second casing member for engaging with said first and said at least one second spring blades of said second casing member.

15. The organizing device as claimed in claim 1, wherein said second casing member includes a lower notch formed in said lower portion of said second casing member and located below said recess of said second casing member, and a bulge extended and located between said recess and said lower notch of said second casing member for engaging with said first and said at least one second spring blades of said second casing member.

16. The organizing device as claimed in claim 1, wherein said first casing member includes a spring element extended from said inner portion and located in front of said recess of said first casing member and located in said opening portion of said recess of said first casing member, for engaging with said cable.

17. The organizing device as claimed in claim 16, wherein said spring element of said first casing member is extended upwardly from said lower portion of said first casing member.

18. The organizing device as claimed in claim 1, wherein said second casing member includes a spring element extended from said inner portion and located in front of said recess of said second casing member and located in said opening portion of said recess of said second casing member, for engaging with said cable.

19. The organizing device as claimed in claim 18, wherein said spring element of said second casing member is extended upwardly from said lower portion of said second casing member.

* * * * *